United States Patent [19]

Pugnale et al.

[11] Patent Number: 4,639,164

[45] Date of Patent: Jan. 27, 1987

[54] UNDERGROUND TANK SUMP AND PIPING SYSTEM

[75] Inventors: Peter J. Pugnale, The Woodlands, Tex.; Michael J. Messmer, Toledo, Ohio

[73] Assignee: Owens-Corning Fiberglas Corporation, Toledo, Ohio

[21] Appl. No.: 730,961

[22] Filed: May 6, 1985

[51] Int. Cl.⁴ .............................................. B65D 25/24
[52] U.S. Cl. ...................................... 405/54; 405/55; 220/18
[58] Field of Search ....................... 405/53, 52, 54, 59, 405/55, 129, 128; 220/18

[56] References Cited

U.S. PATENT DOCUMENTS

| | | | |
|---|---|---|---|
| 1,520,230 | 12/1924 | Flath | 405/53 |
| 3,300,983 | 1/1967 | Dougherty et al. | 405/53 |
| 3,695,289 | 10/1972 | Capdevielle et al. | 405/59 |
| 3,848,765 | 11/1974 | Dürkop | 220/18 |
| 4,110,947 | 9/1978 | Murray et al. | 405/54 |

FOREIGN PATENT DOCUMENTS

| | | | |
|---|---|---|---|
| 557837 | 6/1957 | Belgium | 405/52 |
| 2227852 | 12/1973 | Fed. Rep. of Germany | 405/52 |
| 1044399 | 9/1966 | United Kingdom | 405/52 |

Primary Examiner—Cornelius J. Husar
Assistant Examiner—Peter M. Cuomo
Attorney, Agent, or Firm—Ronald C. Hudgens; Patrick P. Pacella; Paul J. Rose

[57] ABSTRACT

Sumps are mounted on manway fittings of underground tanks, and all piping runs are routed through a sump. Underground portions of pipes between a sump and a point above ground are provided with a double wall. Filling spills and leakage from pipes into the environment are thereby generally prevented.

1 Claim, 4 Drawing Figures

UNDERGROUND TANK SUMP AND PIPING SYSTEM

TECHNICAL FIELD

This invention relates generally to underground storage tanks, and more particularly to a piping and sump system for a double-wall underground tank, the system being designed to prevent leaks and spills into the environment.

BACKGROUND ART

Environmental concerns have resulted in increasing popularity of double-wall underground storage tanks with leak detecting means. Prior to our invention, however, the environment was unprotected against leaks in pipes associated with an underground tank and against accidental spillage occurring during filling of an underground tank.

DISCLOSURE OF INVENTION

In accordance with the invention, sumps are provided atop flanges of flanged manway fittings mounted in openings in an upper wall portion of an underground tank. Each pipe run communicating with the inside of the tank also communicates with a sump. Pipe portions leading from a sump to a point above ground are provided with double walls.

BRIEF DESCRIPTION OF DRAWINGS

The invention is more fully explained hereinafter, reference being had to the accompanying drawings in which.

BEST MODE OF CARRYING OUT THE INVENTION

Figure 1:
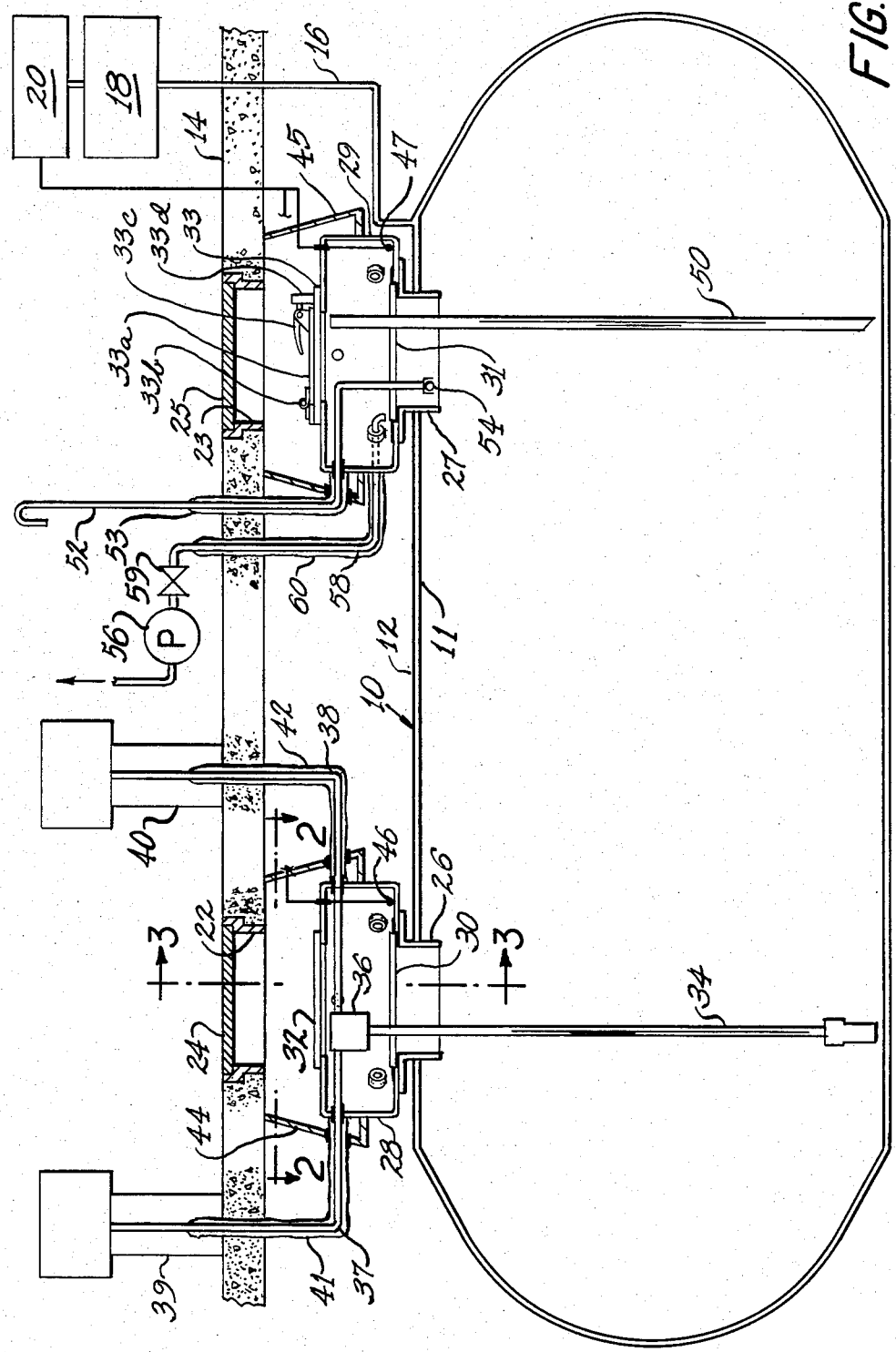
FIG. 1 is a schematic elevational view, partly in section, of an underground tank having a piping and sump system constructed in accordance with the invention associated therewith.

With reference to the drawings, FIG. 1 schematically shows a double-wall underground tank 10 preferably made of non-corrosive glass fiber reinforced resin and including an inner wall 11 and an outer wall 12. The tank 10 is buried in select fill material such as pea gravel (not shown) beneath a concrete slab 14. A leak-detecting liquid fills the space between the inner wall 11 and the outer wall 12 and also fills a pipe 16 connecting the space to a liquid reservoir 18. A drop in the level of liquid in the reservoir 18 signifies the presence of a leak either in the inner wall 11 or in the outer wall 12 and is registered by a light, bell, or buzzer in the signal box 20.

Two square steel screed frames 22 and 23 with covers 24 and 25 are provided in the slab 14 in alignment respectively with two flanged glass fiber reinforced resin fittings 26 and 27 provided on the tank 10. In accordance with the invention, two sumps 28 and 29 preferably molded of glass fiber reinforced resin are mounted respectively on flanges of the manway fittings 26 and 27. Openings in the bottom walls of the sumps are closed respectively by circular plates 30 and 31 bolted in place. An opening in the top wall of the sump 28 (FIGS. 1-3) is closed by a square plate 32 bolted into position. An opening in the top wall of the sump 29 has a closure 33 bolted in place but provided with a door 33a, hinges 33b, handle 33c, and latch 33d.

An intake pipe 34 is mounted in the plate 30 and connected to a pump 36 within the sump 28, the pump having outlet pipes 37 and 38 respectively leading through a sidewall of the sump to dispensers 39 and 40 above ground. Below ground level, the pipes 37 and 38 are surrounded respectively by lengths 41 and 42 of flexible plastic tubing clamped at one end to bushing portions or pipe stubs of the sump 28 as better shown in FIG. 4 and clamped at the other end to the pipes above ground. Risers 44 and 45 are provided respectively on the sumps 28 and 29 and extend upwardly to the slab 14 to retain gravel fill on the outside thereof. Sensors 46 and 47 are provided respectively in the sumps 28 and 29 adjacent their bottom walls and electrically connected to the signal box 20 to indicate accumulation of liquid. In an alternative construction, the sumps 28 and 29 are directly connected by a double-wall pipe and only one of the sensors 46 and 47 is used.

A fill pipe 50 is mounted in the plate 31 and is accessible upon opening of the door 33a. A vent pipe 52 connects the inside of the tank 10 with the atmosphere and includes a portion extending through a sidewall of the sump 29. Below ground level, the vent pipe 52 is surrounded by a length 53 flexible plastic tubing clamped at one end to a bushing portion or pipe stub of the sump 29 and clamped at the other end to the pipe 52 above ground. The lower end of the vent pipe 52 is provided with a check valve 54.

Optionally, liquid accumulating in the sumps 28 and 29 may be automatically pumped to an above-ground holding tank. As illustrative of this, a pump 56 is shown connected to the sump 29 by a pipe 58 having a valve 59 therein and having a portion extending through a sidewall of the sump. Below ground level, the pipe 58 is surrounded by a length 60 of flexible plastic tubing clamped at one end to a bushing portion or pipe stub of the sump 29 and clamped at the other end to the pipe above ground. The sump 28 may be provided with a similar pump, but only one is needed if the sumps are interconnected. The pump 56 may be activated in response to a signal from the sensor 47.

Figure 2:
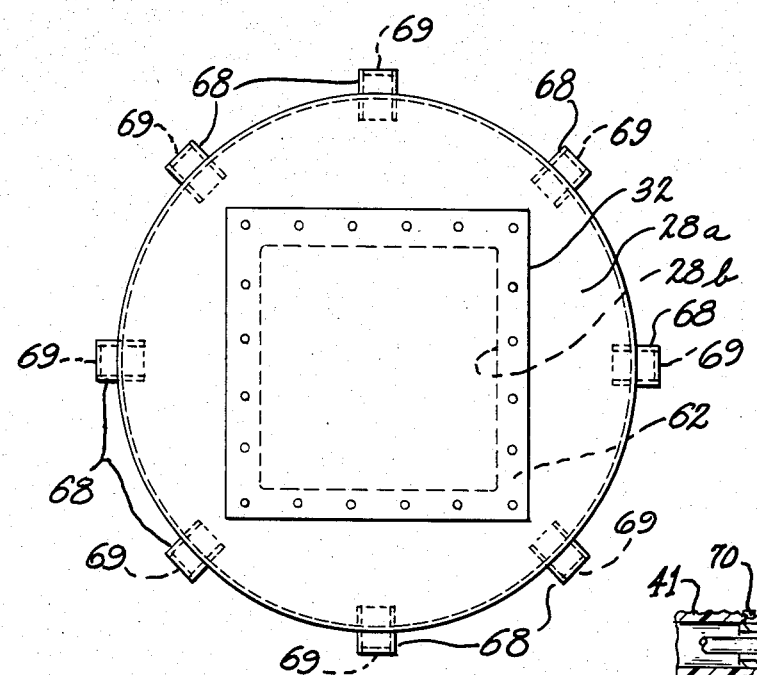
FIG. 2 is a top plan view, before installation of piping, of the left-hand sump of FIG. 1, taken in the direction of arrows 2—2.
Figure 3:
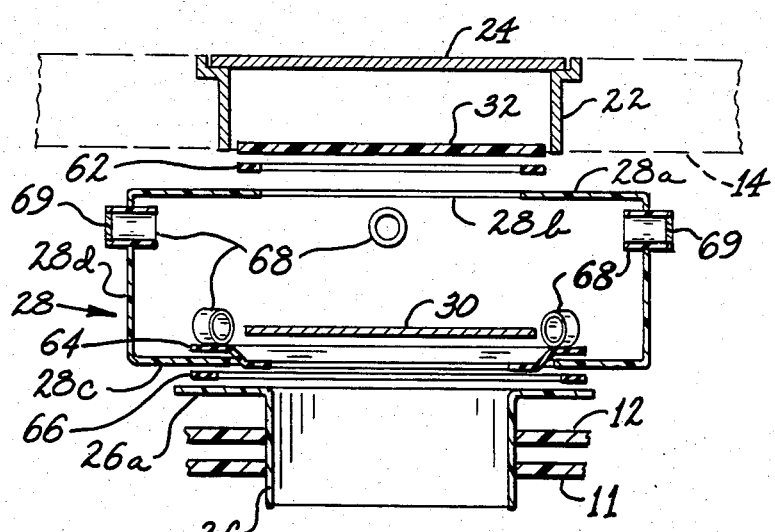
FIG. 3 is an exploded vertical section view, before installation of piping, taken along the line 3—3 of FIG. 2.

The sump 28 is better shown in FIGS. 2 and 3 before installation of piping. Generally, the sump 28 is in the form of a short hollow cylinder. An upper wall portion 28a thereof is provided with a square opening 28b normally covered by the square plate 32 formed of either glass fiber reinforced resin or steel. The plate 32 is bolted in place by bolts and nuts (not shown), a gasket 62 being inserted between the plate 32 and the upper wall portion 28a.

The circular plate 30 is smaller than the concentric opening in the bottom wall 28c of the sump and is bolted to a radially inner portion of a flange 26a of the manway fitting 26 by bolts and nuts (not shown), a radially inner portion of a gasket 64 being disposed therebetween. In addition, a radially outer portion of the flange 26a is bolted to the outer side of the bottom wall 28c by bolts and nuts (not shown) which also fasten a radially outer portion of the gasket 64 to the inner side of the bottom wall 28c. A gasket 66 is provided between the flange 26a and the bottom wall 28c.

A plurality of pipe stubs 68 are mounted in a sidewall 28d of the sump 28 in circumferentially spaced relationship and alternately disposed in upper and lower positions. The pipe stubs 68 serve as bushings for any pipes passing through the sidewall 28d. Before a pipe is mounted in a pipe stub 68, an outer end thereof is closed by a plug 69.

Figure 4:
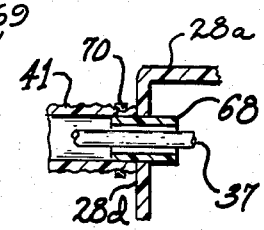
FIG. 4 is a fragmentary view, after installation of piping, of the upper left-hand portion of the sump of FIG. 3.

As an example, FIG. 4 shows a circular clamp 70 clamping the flexible plastic tubing 41 for the pipe 37 to the respective pipe stub 68.

Any underground leakage from the pipes 37 and 38 will be delivered to the sump 28 respectively by the tubing 41 and 42. Similarly, any underground leakage from the pipes 52 and 58 will be delivered to the sump 29 respectively by the tubing 53 and 60. Further, any spills upon connecting or disconnecting a hose to the fill pipe 50 will be caught by the sump 29.

While the piping and sump system in most instances would be used with a double-wall underground tank as shown and described, it can also be used with single-wall tanks.

Various modifications may be made in the structure shown and described without departing from the spirit and scope of the invention.

We claim:

1. An underground storage tank and a sump and piping assembly therefor comprising an elongate, generally cylindrical tank installed underground with a longitudinal axis thereof extending generally horizontally, a manway fitting in an upper wall portion of the tank, the manway fitting including a tubular portion in communication with the inside of the tank and an upper external flange, a cylindrical sump mounted underground on the flange of the manway fitting in upwardly spaced relationship to the upper wall portion of the tank and including a bottom wall and a cylindrical sidewall, and piping in communication with the inside of the tank through the bottom wall of the sump, there being no communication between the sump and the inside of the tank except through said piping, said piping also communicating with an above-ground dispenser through the sidewall of the sump, an underground portion of the piping leading to the dispenser from the sump being provided with a double wall including an inner wall and an outer wall, and said outer wall restraining any liquid leaked from said inner wall from contaminating the environment by conducting the leaked liquid through the sidewall to the inside of the sump.

* * * * *